United States Patent [19]
Onishi et al.

[11] Patent Number: 5,590,253
[45] Date of Patent: Dec. 31, 1996

[54] SEQUENCE PROGRAM EDIT SYSTEM FOR INSERTING ADDITIONAL GRAPHIC ELEMENTS AND FOR AUTOMATICALLY INSERTING VERTICAL CONNECTOR LINES

[75] Inventors: Yasushi Onishi; Yoshiharu Saiki, both of Minamitsuru-gun, Japan

[73] Assignee: Fanuc Ltd., Japan

[21] Appl. No.: 497,981

[22] Filed: Jul. 3, 1995

[30] Foreign Application Priority Data

Jul. 14, 1994 [JP] Japan .................................. 6-161740

[51] Int. Cl.⁶ .................................................. G06T 11/00
[52] U.S. Cl. ........................... 395/133; 395/135; 395/326
[58] Field of Search ................................. 395/133, 135, 395/140, 141, 155–161, 500, 650, 922

[56] References Cited

U.S. PATENT DOCUMENTS

5,168,441  12/1992  Onarheim et al. ....................... 364/146

*Primary Examiner*—Almis R. Jankus
*Attorney, Agent, or Firm*—Staas & Halsey

[57] ABSTRACT

A sequence program edit system expressed by a sequential function chart (SFC) system. When a graphic input device inputs a graphic element of a flowchart to respective blocks formed by partitioning a display screen into rows and columns, an input graphic display device displays the inputted graphic element on the display screen. On the other hand, when an insertion command is issued to an arbitrary block on the display screen by an insertion command device through a cursor, an insertion and display device automatically inserts and displays graphic elements of vertical connector lines on respective blocks in the same row as that of the arbitrary block to which the insertion command has been issued.

3 Claims, 7 Drawing Sheets

SEQUENCE PROGRAM EDIT SYSTEM FOR INSERTING ADDITIONAL GRAPHIC ELEMENTS AND FOR AUTOMATICALLY INSERTING VERTICAL CONNECTOR LINES

BACKGROUND OF THE INVENTION (1) Field of the Invention

The present invention relates to a sequence program edit system for editing a sequence program displayed on a screen, and more specifically, to a sequence program edit system for editing a sequence program displayed by an SFC system.

(2) Description of the Related Art

In general, sequence programs to be executed by a programmable controller (PC) are expressed by many formats such as logic descriptions, ladder diagrams and the like. Among them, flowcharting is advantageous as it makes an overall flow of work easy to understand. A sequential function chart (SFC) system is available as one of the flowcharting. The SFC system represents a process to be executed in each step by various types of graphic elements such as transition, step and the like and expresses the overall flow by the combination of the graphic elements. However, a program representative of a specific operation in each step is created by logic descriptions, ladder diagrams and the like.

A sequence program of the SFC system can be created in such a manner that a plurality of blocks are formed by virtually partitioning a display screen into rows and columns and a graphic element is inputted by a software key after a cursor is placed on the desired block. When another graphic element is desired to be inserted vertically between graphic elements which have already been inputted, a cursor is positioned on the desired block and the desired graphic element is inserted therein. All the graphic elements below the row of the inserted graphic element are shifted downward by one block, and at the same time blanks are automatically inserted into all the blocks in the same row of the inserted graphic element to keep a balance as a whole.

However, since the blocks in the same row other than the block into which the graphic element has been inserted are inherently connected to the upper and lower blocks through any graphic elements, if these blocks are made blank, the flow of a program is cut off. To cope with this problem, a graphic of a vertical connector line has been conventionally inserted by an operator through a key operation into the blocks where the blanks were inserted. Thus, when there are many blocks into which the graphic must be inserted, a time-consuming job is required and a working efficiency is lowered.

SUMMARY OF THE INVENTION

An object of the present invention is to provide a sequence program edit system for improving the efficiency of a job for creating a sequence program.

To achieve the above object, there is provided a sequence program edit system expressed by a sequential function chart (SFC) system, which comprises graphic input means for inputting graphic elements of a flowchart to respective blocks formed by virtually partitioning a display screen to rows and columns, input graphic display means for displaying the inputted graphic elements on the display screen, insertion command means for issuing an insertion command to an arbitrary block on the display screen, and insertion and display means for inserting the graphic elements of vertical connector lines to the blocks in the same row as that of the block to which the insertion command is issued and displaying the graphic elements there.

When graphic elements of a flowchart are inputted to respective blocks formed by virtually partitioning a display screen by graphic input means, input graphic display means displays the inputted graphic elements on the display screen. On the other hand, when an insertion command is issued to an arbitrary block on the display screen by insertion command means through a cursor, insertion and display means inserts and displays the graphic elements of vertical connector lines on respective blocks in the same row as the block to which the insertion command is issued, and displays the graphic elements there.

The above and other objects, features and advantages of the present invention will become apparent from the following description when taken in conjunction with the accompanying drawings which illustrate a preferred embodiment of the present invention by way of example.

DESCRIPTION OF THE PREFERRED EMBODIMENT

An embodiment of the present invention will be described below with reference to the drawings.

Figure 1:
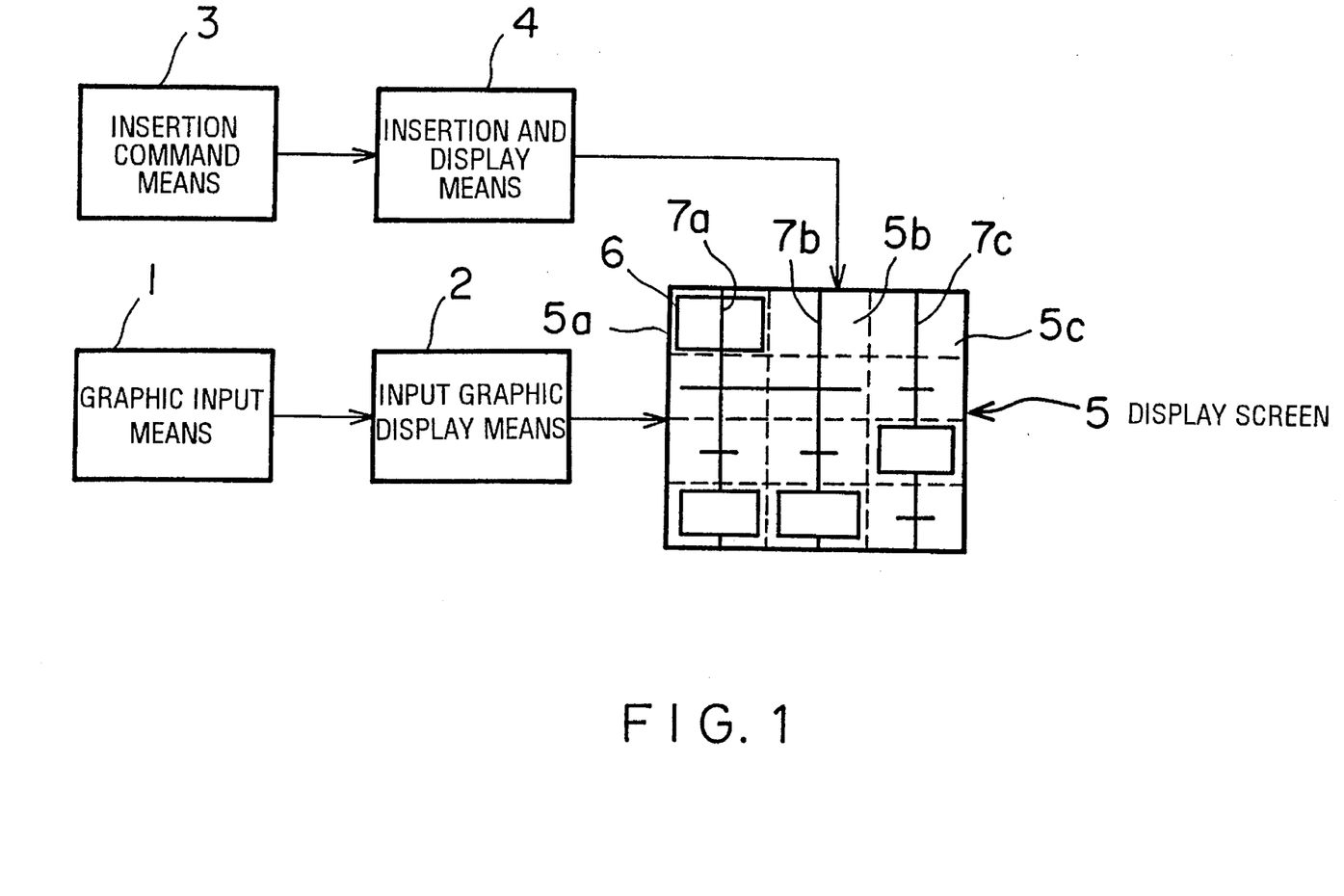
FIG. 1 is a block diagram showing a concept of a function of an embodiment.

FIG. 1 is a block diagram showing a concept of a function of an embodiment. When graphic elements of a flowchart are inputted by graphic input means 1 to respective blocks 5a, 5b, 5c and the like which are created by virtually partitioning a display screen 5 to rows and columns, the input graphic elements are displayed on the display screen 5 by input graphic display means 2. On the other hand, when an insertion command is issued to the arbitrary block 5a on the display screen 5 by insertion command means 3 through a cursor 6, insertion and display means 4 inserts the graphics of vertical connector lines 7a, 7b, 7c into the blocks 5a, 5b, 5c, respectively. The blocks 5b, 5c are in the same row as that of the block 5a to which the insertion command has been issued. And the insertion and display means 4 displays the graphics there.

Figure 2:
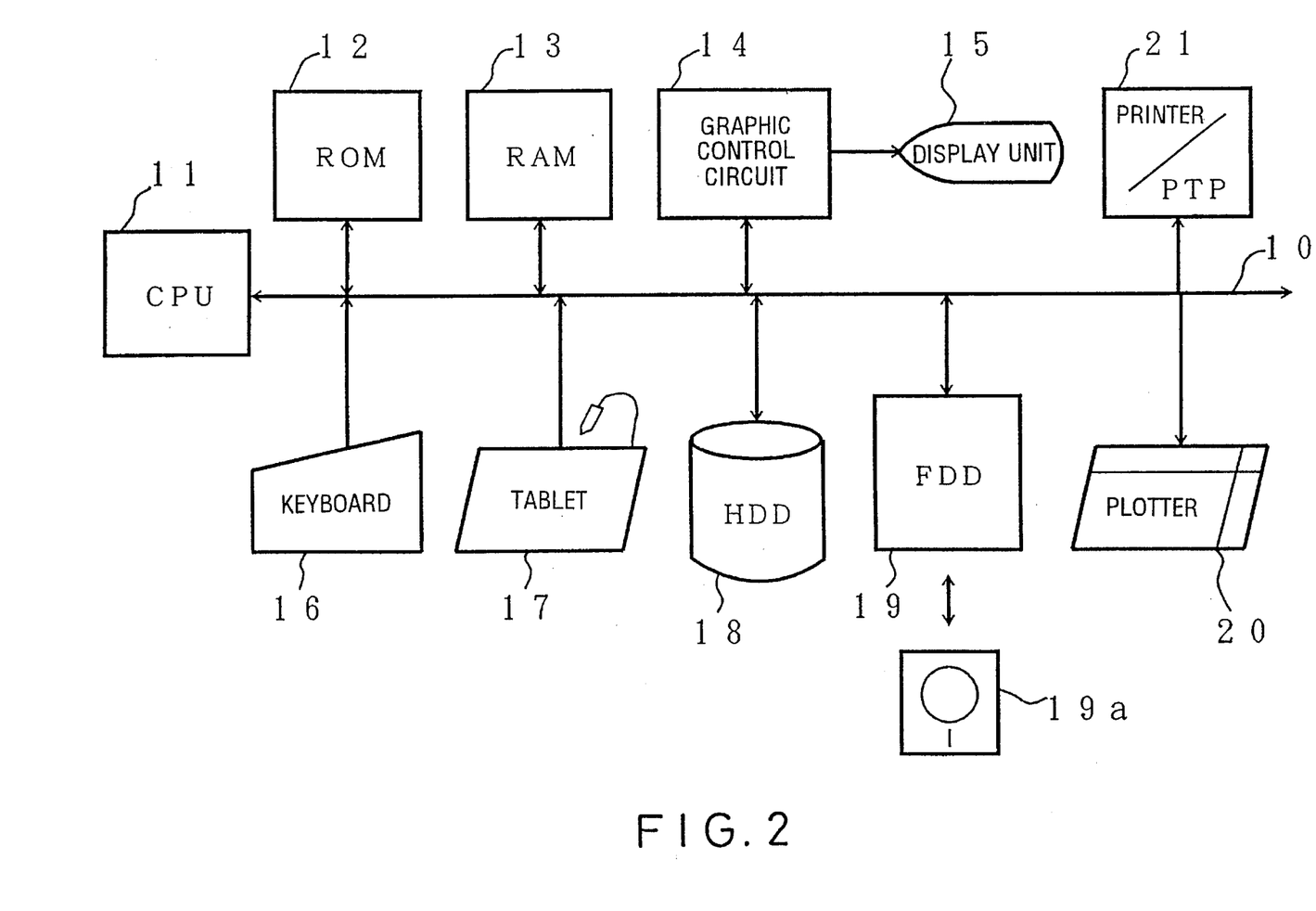
FIG. 2 is a block diagram of a hardware arrangement of an automatic programming apparatus embodying the present invention.

FIG. 2 is a block diagram of a hardware arrangement of an automatic programming apparatus embodying the present invention. A processor 11 controls the automatic programming apparatus in its entirety according to a system program stored in a ROM 12. A RAM 13 stores internal data, a created sequence program and the like.

A graphic control circuit 14 converts display data from the processor 11 into a displayable signal and supplies the displayable signal to a display unit 15. The display unit 15 receives the displayable signal and displays it on the screen. The display unit 15 comprises a CRT, a liquid crystal display panel or the like.

A keyboard 16 includes operation keys used to input data, function keys and the like. Graphic elements to be described later are input and inserted by the keyboard 16. Data is also input by a tablet 17, a mouse not shown and the like.

A hard disc drive (HDD) 18 stores data such as a created sequence program and the like which are to be retained after the power supply is turned off. A floppy disk drive (FDD) 19 can read a sequence program and the like by driving a floppy disk 19a and write a created or edited sequence program on the floppy disk 19a.

The created sequence program can be also output to a plotter 20, a printer/PTP (paper tape puncher) 21. Note, these elements are interconnected through a bus 10.

Next, a specific example of the sequence program edit system executed by the automatic programming apparatus arranged above will be described below.

Figure 3:
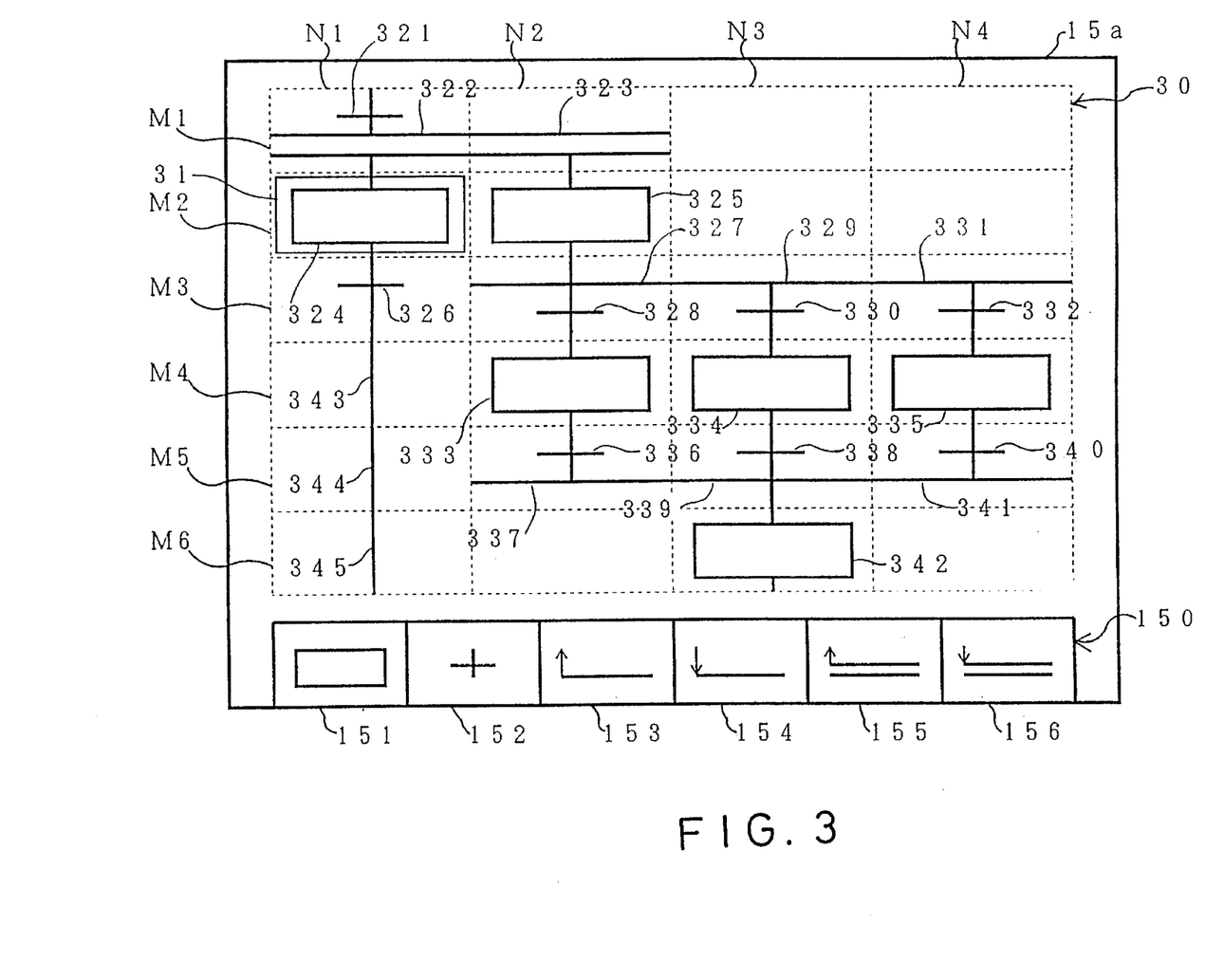
FIG. 3 is a view showing an example of an edit screen of a sequence program created by an SFC system.

FIG. 3 is a view showing an example of an edit screen of a sequence program created by the SFC system. A graphic element display section 30 is disposed on a display screen 15a of the display unit 15. The graphic element display section 30 is virtually partitioned to six rows M1–M6 and four columns N1–N4. That is, the graphic element display section 30 is partitioned to 24 blocks. Hereafter, a block having a row number Mm and a column number Nn is expressed as a block MmNn with the respective numbers of the row and column arranged side by side. For example, a block located at the position of a row M3 and a column N2 is expressed as a block M3N2.

The display screen 15a includes a menu display section 150 in its lower area below the graphic element display section 30. The menu display section 150 is provided with, for example, six menus 151–156. There are displayed graphic elements representing "step", "transition", "selective branch processing (open)", "selective branch processing (close)", "parallel branch processing (open)", "parallel branch processing (close)" and the like, respectively on each of the menus 151–156. Note, graphic elements which cannot be displayed on a single screen can be displayed by switching an operation to the next screen.

With the screen arrangement described above, when an operator moves a cursor 31 to a desired block by a key operation and selects any of the menus 151–156 by a software key (not shown), the graphic element of the selected menu is displayed on the block. For example, when the cursor 31 is placed on a block M2N1 and the menu 151 is selected, a graphic element of step 324 is displayed on the block M2N1 as shown in FIG. 3.

Respective graphic elements 321–345 are inputted and displayed in the same way. Note, transition can be displayed on the same block together with the selective branch processing or the parallel branch processing.

Incidentally, it may be necessary to insert an additional graphic element after the creation of the above SFC. Next, an operation for inserting such a graphic element will be described.

Figure 4:
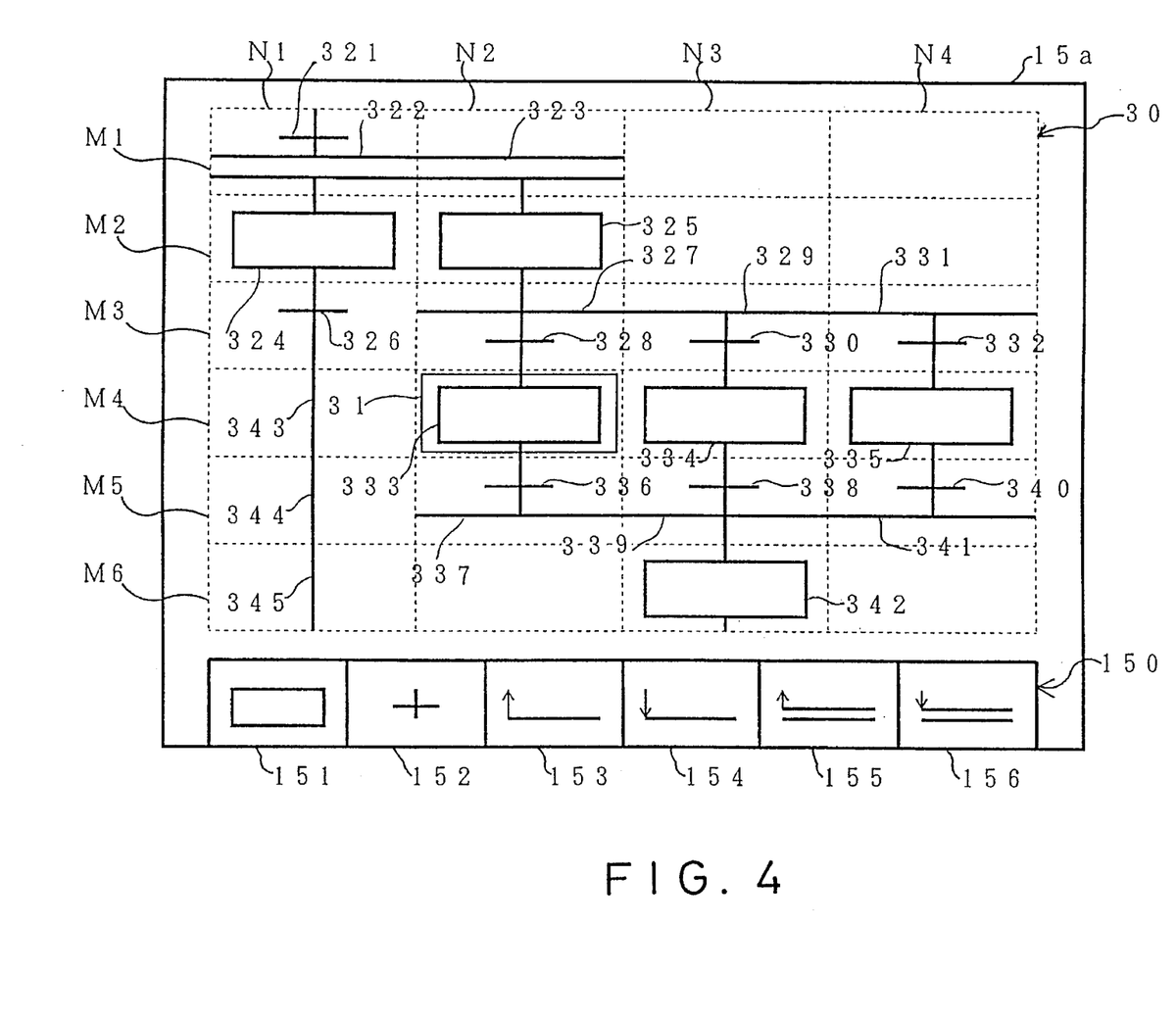
FIG. 4 is a view explaining an inserting operation.

FIG. 4 is a view explaining the inserting operation. First, the operator moves the cursor 31 to the position of a block into which insertion is desired and the insertion is commanded through a key operation. FIG. 4 shows an example that a graphic element of another step is to be input in front of a graphic element of step 333 on a block M4N2. However, when a graphic element of a step is inserted, since a graphic element of a transition must also be inputted together, an input operation is carried out twice as to the graphic element 333.

Figure 5:
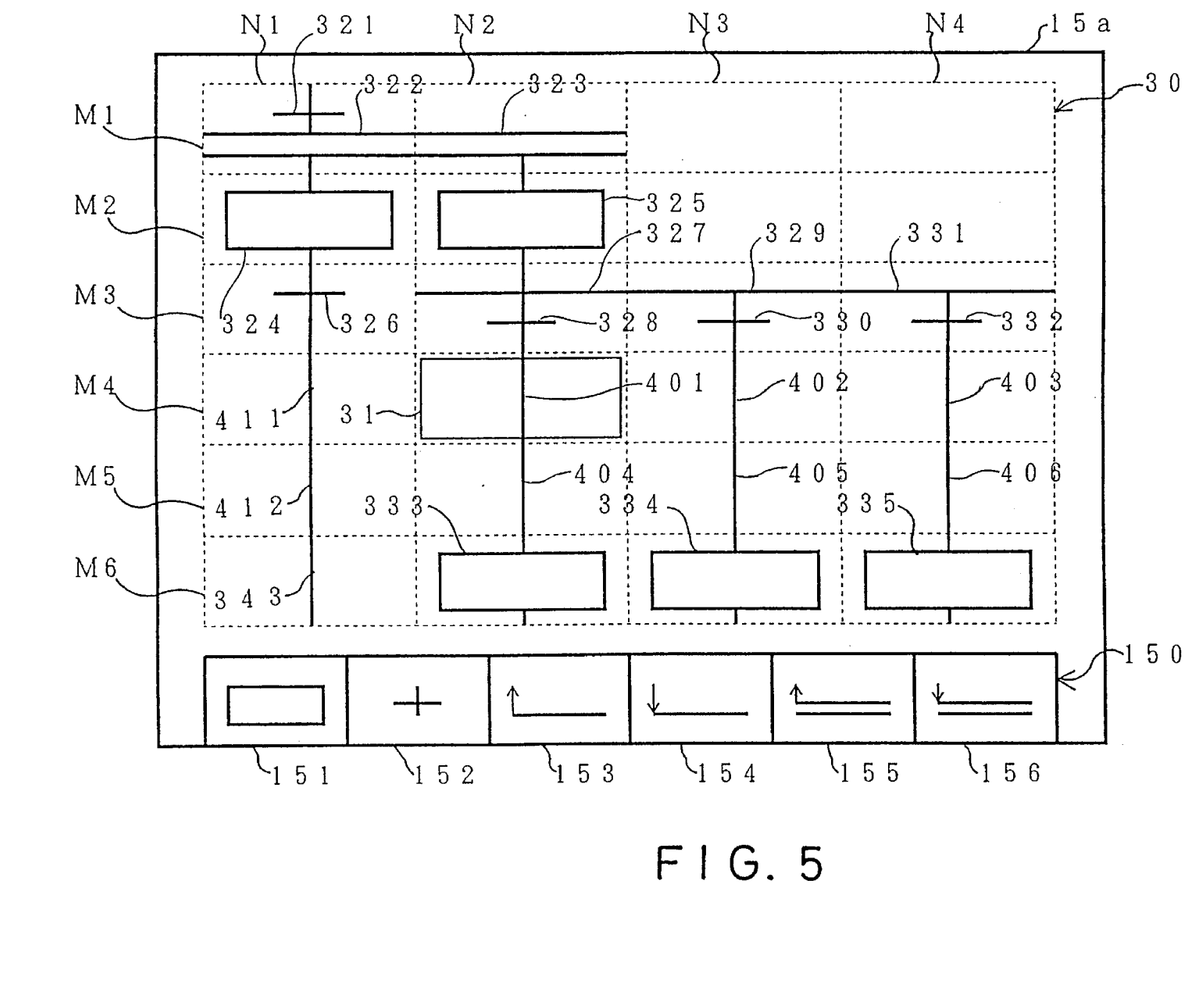
FIG. 5 is a view showing a state after the completion of the insertion processing.

FIG. 5 is a view showing a state after the completion of the insertion processing. Since two blanks are inserted in front of the graphic element 333, the graphic element 333 is moved to a block M6N2 which is two blocks lower from the block M4N2 and displayed therein. At the same time, the graphic elements of vertical connector lines 401, 404 are automatically displayed to the block M4N2 and a block M5N2, respectively.

Further, the respective graphic elements 343, 334, 335 on blocks M4N1, M4N3, M4N4 which are located in the same row as that of the graphic element 333 in FIG. 4 are moved to blocks M6N1, M6N3, M6N4 which are two blocks lower from the above respective blocks at the same time and displayed there. Then, graphic elements of vertical connector lines 411, 402, 403, 412, 405, 406 are automatically displayed on the respective blanked blocks M4N1, M4N3, M4N4, M5N1, M5N3, M5N4 as shown in FIG. 5.

In this state, the operator places the cursor 31 to a desired block and inputs a graphic element.

Figure 6:
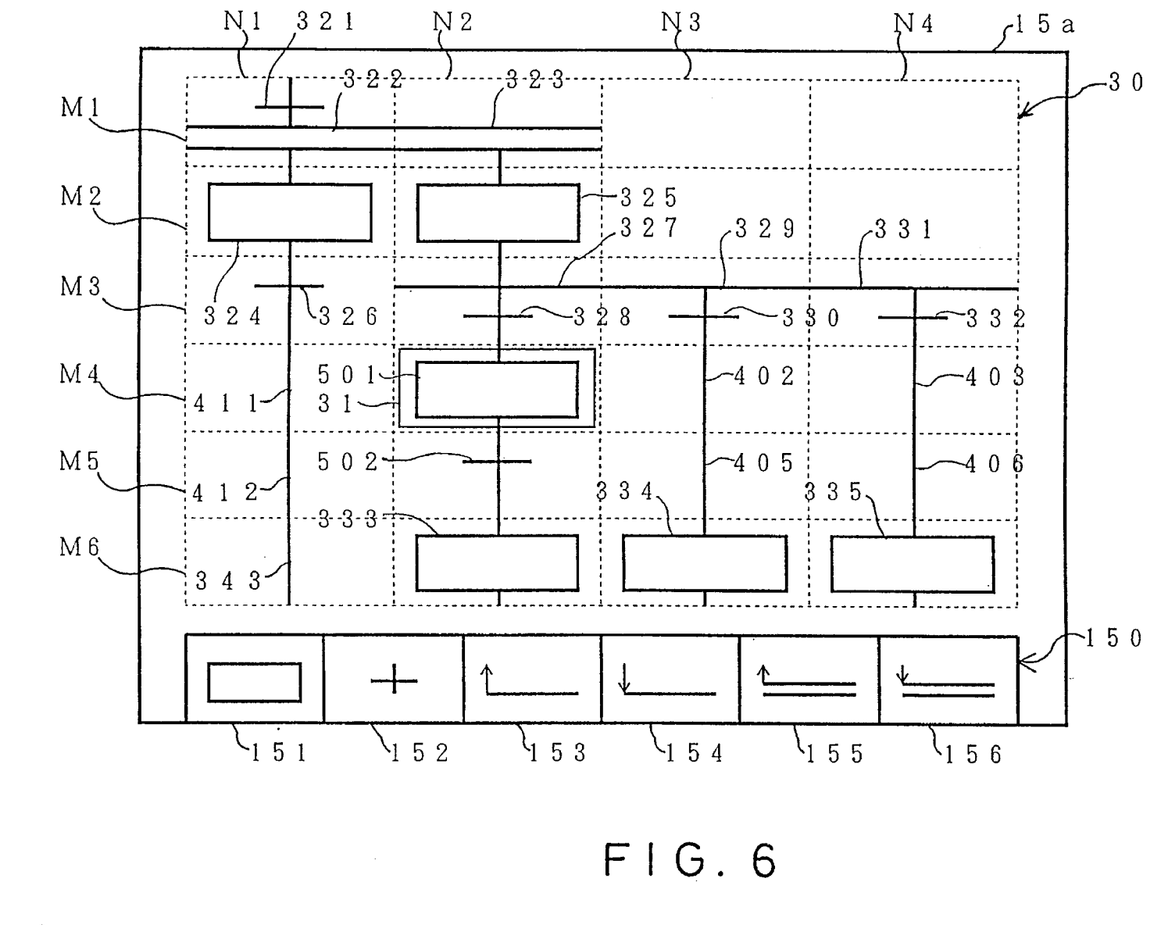
FIG. 6 is a view showing an example of input of graphic elements after the completion of the insertion processing.

FIG. 6 is a view showing an example of input of graphic elements after the completion of insertion processing. After the insertion processing, the operator can input a graphic element into the block at a desired position by moving the cursor 31 and selecting any key as described above. For example, the displays on the blocks M4N2 and M5N2 can be rewritten to a graphic element of step 501 and a graphic element of transition 502, respectively as shown in FIG. 6.

Figure 7:
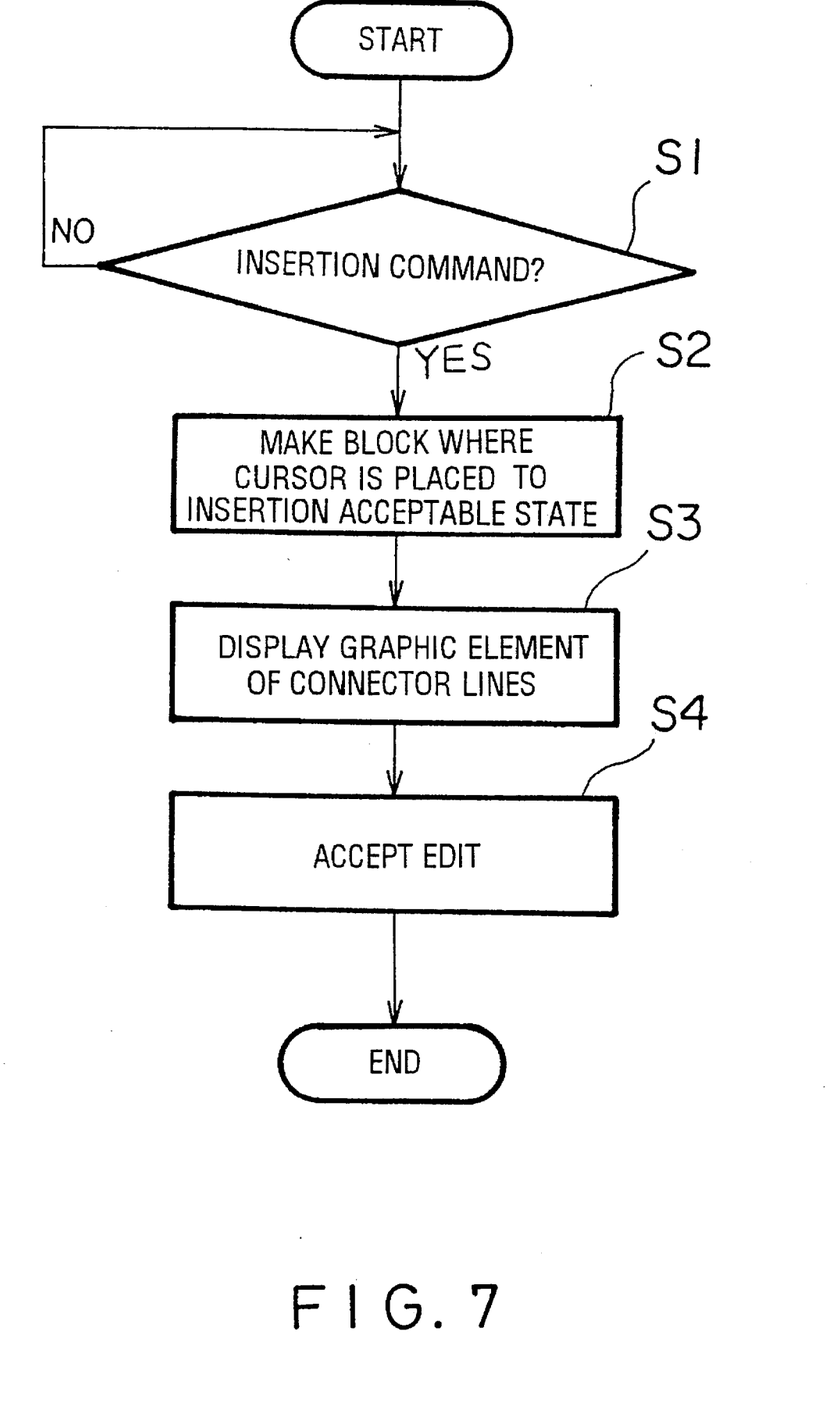
FIG. 7 is a flowchart showing a processing sequence on a processor side for executing a graphic element inserting operation.

FIG. 7 is a flowchart showing a processing sequence on the processor 11 side for inserting the above graphic element.

[S1] It is determined whether an insertion command is issued or not, and if the insertion command is issued, the process goes to Step S2, and if not, Step S1 is repeated.

[S2] A block where the cursor 31 is placed is made to an insertion acceptable state.

[S3] The graphic element of a vertical connector line is displayed on the block made to the insertion acceptable state.

[S4] An edit operation for inputting an additional graphic element or deleting a graphic element is accepted.

As described above, according to the embodiment, when a block designated by the cursor 31 is made to an insertion acceptable state, the blocks located in the same row as that of the above designated block are also made to the insertion acceptable state and the graphic elements of the connector lines are automatically inserted into the respective blocks and displayed there. Consequently, the operator need not manually input the graphic elements of the connector lines and thus the efficiency of a job for creating a sequence program of the SFC system can be improved.

As described above, according to the present invention, when an insertion command is issued to an arbitrary block on a display screen, the graphics of vertical connector lines are automatically inserted into the blocks in the same rows as that of the block to which the insertion command is issued. Thus, the graphics of connector lines need not be manually inputted and the efficiency of a job for creating a sequence program of the SFC system can be improved.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A sequence program edit system expressed by a sequential function chart (SFC) system, comprising:

graphic input means for inputting graphic elements of a flowchart to respective blocks formed by partitioning a display screen into rows and columns;

input graphic display means for displaying the inputted graphic elements on the display screen;

insertion command means for issuing an insertion command to an arbitrary block on the display screen; and insertion and display means for automatically inserting and displaying graphic elements of vertical connector lines to blocks in the same row as that of the arbitrary block to which the insertion command has been issued.

2. A sequence program edit system according to claim 1, wherein said graphic input means inputs the graphic element selected by a software key and said input graphic display means displays the graphic element on the block where a cursor is placed.

3. A sequence program edit system according to claim 1, wherein said graphic input means inputs an additional graphic element and said input graphic display means displays said additional graphic element on the blocks where the graphic elements of vertical connector lines are inserted and displayed.

* * * * *